United States Patent
Takahashi et al.

(10) Patent No.: US 10,843,346 B2
(45) Date of Patent: *Nov. 24, 2020

(54) GRIPPING TOOL, GRIPPING SYSTEM, AND METHOD FOR MANUFACTURING GRIPPER

(71) Applicant: KABUSHIKI KAISHA TOSHIBA, Minato-ku (JP)

(72) Inventors: Hiromasa Takahashi, Minato (JP); Yoko Tokuno, Yokohama (JP); Emiko Ishida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,379

(22) Filed: Mar. 25, 2019

(65) Prior Publication Data
US 2019/0217487 A1    Jul. 18, 2019

Related U.S. Application Data

(63) Continuation of application No. PCT/JP2017/034351, filed on Sep. 22, 2017.

(30) Foreign Application Priority Data

Mar. 13, 2017    (JP) .................................. 2017-047891

(51) Int. Cl.
*B25J 15/06* (2006.01)
*B29C 43/18* (2006.01)
(Continued)

(52) U.S. Cl.
CPC ....... *B25J 15/0616* (2013.01); *B25J 15/0023* (2013.01); *B25J 19/007* (2013.01); (Continued)

(58) Field of Classification Search
CPC ................... B25J 15/0033; B25J 15/0608; B25J 15/0023; B25J 15/08; B25J 15/0009;
(Continued)

(56) References Cited

U.S. PATENT DOCUMENTS 4,294,424 A * 10/1981 Teissier ................. B25B 11/007
248/205.9
4,561,686 A * 12/1985 Atchley ................ B66C 1/0206
294/188

(Continued)

FOREIGN PATENT DOCUMENTS

JP    2008-161980 A    7/2008
JP    2008-528408 A    7/2008
(Continued)

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper. The gripper is flexible. A granular material is provided in an interior of the gripper. The gripping tool grips a workpiece by depressurizing the interior of the gripper in a state in which the gripper is caused to contact the workpiece. At least a portion of the gripper includes a resin member and a fibrous member. The fibrous member is provided inside the resin member.

22 Claims, 10 Drawing Sheets

(51) Int. Cl.
  *B25J 15/00* (2006.01)
  *B25J 19/00* (2006.01)
  *B29L 31/00* (2006.01)
  *D01D 5/00* (2006.01)

(52) U.S. Cl.
  CPC ......... *B29C 43/18* (2013.01); *B29L 2031/748* (2013.01); *D01D 5/0007* (2013.01); *D01D 5/0076* (2013.01)

(58) Field of Classification Search
  CPC ...... B25J 15/0246; B25J 9/14; B25J 15/0616; B25J 19/007; A61F 2/586; A61F 2/588; B29C 43/18; B29L 2031/748; D01D 5/0007; D01D 5/0076
  See application file for complete search history.

(56) References Cited

U.S. PATENT DOCUMENTS

| | | | | |
|---|---|---|---|---|
| 6,846,029 | B1* | 1/2005 | Ragner | B25B 9/00 294/219 |
| 8,882,165 | B2* | 11/2014 | Lipson | B25J 15/0023 294/188 |
| 2009/0242719 | A1* | 10/2009 | Carnevali | F16B 47/00 248/346.2 |
| 2010/0054903 | A1* | 3/2010 | Jones | B25J 15/0023 414/800 |
| 2013/0280493 | A1 | 10/2013 | Jackson | |

FOREIGN PATENT DOCUMENTS

| | | |
|---|---|---|
| JP | 2012-176476 | 9/2012 |
| JP | 2013-220658 A | 10/2013 |
| JP | 2014-205207 A | 10/2014 |
| JP | 2015-202543 A | 11/2015 |
| JP | 2018-79561 | 5/2018 |
| JP | 2018-79561 A * | 5/2018 |
| WO | WO 2015/006613 A1 | 1/2015 |

* cited by examiner

GRIPPING TOOL, GRIPPING SYSTEM, AND METHOD FOR MANUFACTURING GRIPPER

CROSS-REFERENCE TO RELATED APPLICATIONS

This is a continuation application of International Application PCT/JP2017/034351, filed on Sep. 22 2017. This application also claims priority to Japanese Application No. 2017-047891, filed on Mar. 13, 2017. The entire contents are incorporated herein by reference.

FIELD

Embodiments described herein relate generally to a gripping tool, a gripping system, and a method for manufacturing a gripper.

BACKGROUND

There is a gripping tool that includes a gripper having a granular material provided in its interior. When the gripper of the gripping tool ruptures, the granular material of the interior scatters into the periphery. Therefore, time is necessary not only to repair the gripping tool but also to clean the periphery of the gripping tool. As a result, the work efficiency decreases greatly.

Therefore, it is desirable to develop a gripping tool in which the rupturing of the gripper does not occur easily.

DETAILED DESCRIPTION

Figure 1:
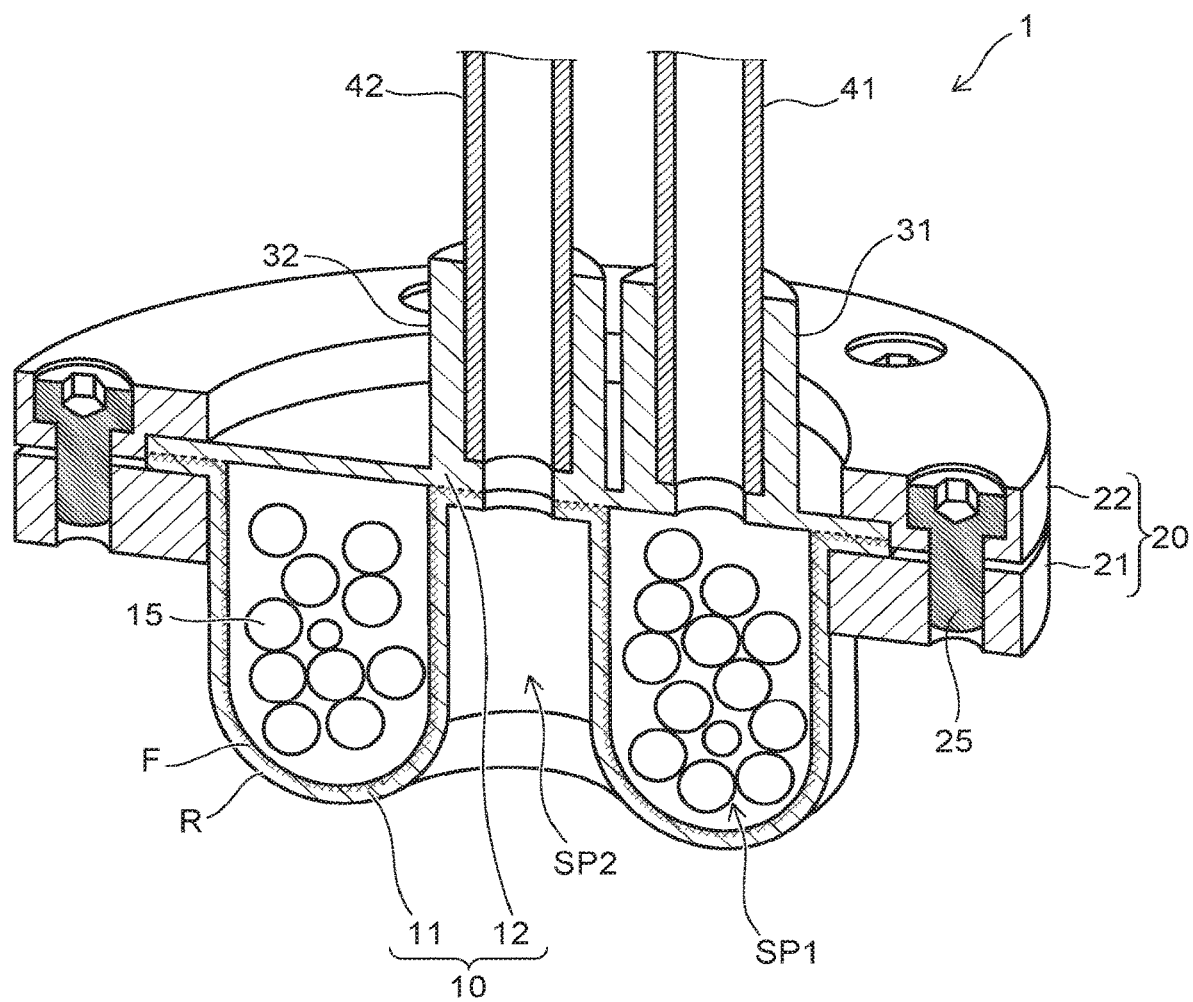
FIG. 1 is a perspective cross-sectional view illustrating a gripping tool according to an embodiment.

According to one embodiment, a gripping tool includes a gripper. The gripper is flexible. A granular material is provided in an interior of the gripper. The gripping tool grips a workpiece by depressurizing the interior of the gripper in a state in which the gripper is caused to contact the workpiece. At least a portion of the gripper includes a resin member and a fibrous member. The fibrous member is provided inside the resin member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a perspective cross-sectional view illustrating a gripping tool 1 according to an embodiment.

The gripping tool 1 according to the embodiment includes a gripper 10 that is flexible. A granular material 15 is provided in the interior of the gripper 10.

More specifically, the gripper 10 includes a first portion 11 and a second portion 12. The first portion 11 contacts the workpiece to be gripped. The second portion 12 opposes the first portion 11. The granular material 15 is provided in a first space SP1 between the first portion 11 and the second portion 12. The gripper 10 is configured by, for example, bonding the first portion 11 and the second portion 12 via a bonding agent. The first portion 11 and the second portion 12 may be bonded by thermal compression bonding.

The outer perimeter of the first portion 11 and the outer perimeter of the second portion 12 are held by a holder 20. Thereby, the first space SP1 is separated from an external space. The holder 20 has, for example, a circular ring configuration. Because only the outer perimeter of the gripper 10 is held by the holder 20, the gripper 10 can deform inside the holder 20 in the direction of a line connecting the first portion 11 and the second portion 12.

The direction of the line connecting the first portion 11 and the second portion 12 is, for example, the vertical direction. The direction of the line connecting the first portion 11 and the second portion 12 includes a first direction (up) from the first portion 11 toward the second portion 12, and a second direction (down) from the second portion 12 toward the first portion 11. Hereinbelow, the description of the embodiments is performed using "vertical direction," "up/above," and "down/below" based on the positional relationship between the first portion 11 and the second portion 12.

As an example, the holder 20 includes a first flange 21 and a second flange 22. The first flange 21 abuts the outer perimeter lower surface of the first portion 11. The second flange 22 abuts the outer perimeter upper surface of the second portion 12. The gripper 10 is held by fastening the first flange 21 and the second flange 22 using a fastener 25 such as a screw, etc.

Figure 2:
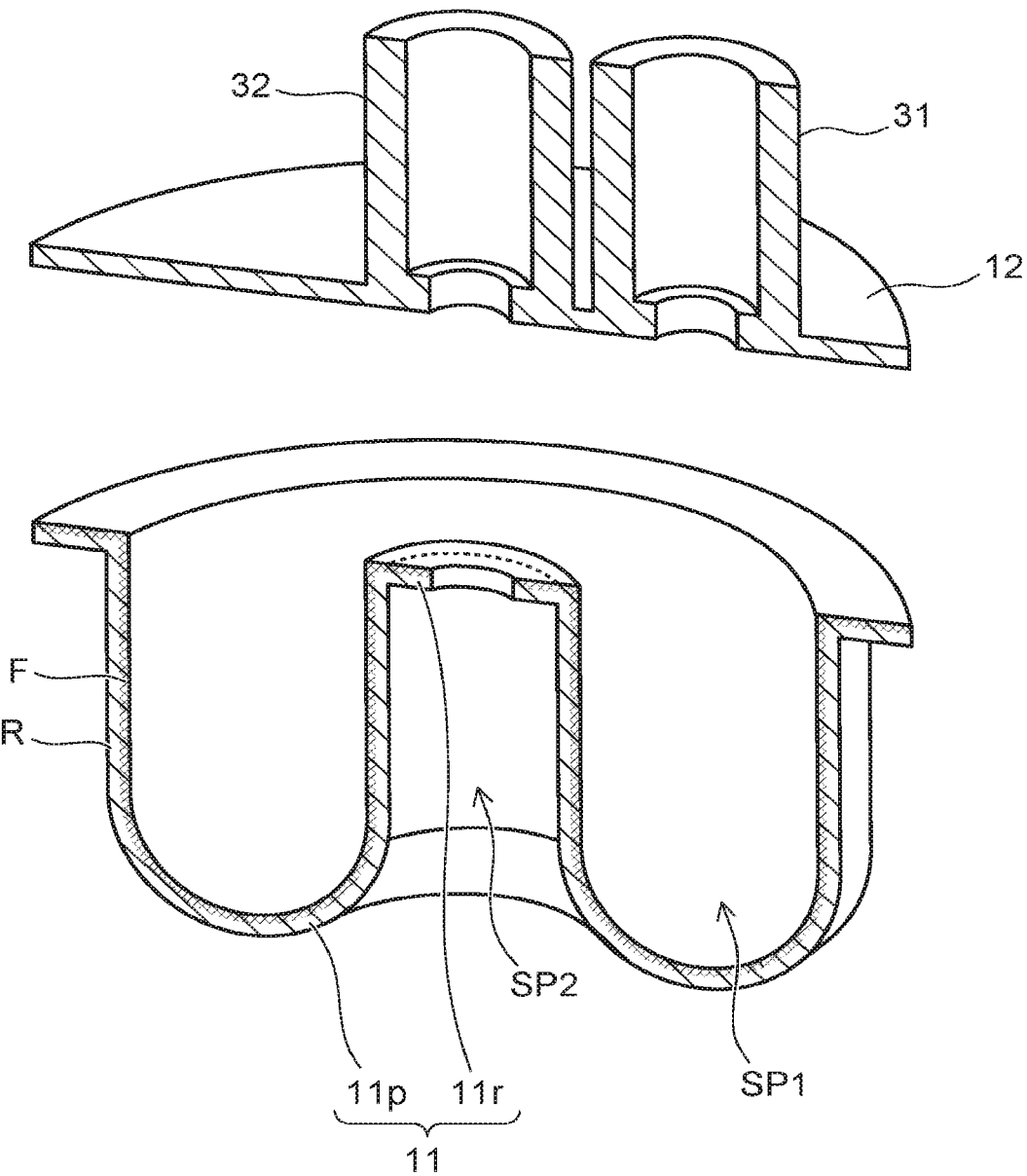
FIG. 2 is a perspective cross-sectional view illustrating the gripper of the gripping tool according to the embodiment.

FIG. 2 is a perspective cross-sectional view illustrating the gripper 10 of the gripping tool 1 according to the embodiment.

The first portion 11 and the second portion 12 of the gripper 10 are illustrated as being separated in FIG. 2.

As illustrated in FIG. 2, the first portion 11 includes a concave portion 11$r$ and a convex portion 11$p$. The concave portion 11$r$ is recessed upward. The concave portion 11$r$ is provided at the center of the gripper 10. The upper surface of the concave portion 11$r$ contacts the second portion 12. The convex portion 11$p$ protrudes downward. The convex portion 11p is provided around the concave portion 11r. The convex portion 11p and the concave portion 11r are continuous with each other.

The concave portion 11r contacts the second portion 12. The convex portion 11p is separated from the second portion 12 in the vertical direction. In the gripping tool 1 illustrated in FIG. 1 and FIG. 2, the first space SP1 is formed between the convex portion 11p and the second portion 12.

A second space SP2 that is surrounded with the concave portion 11r and the convex portion 11p is formed below the first portion 11. Specifically, the top of the second space SP2 is covered with the concave portion 11r. The side of the second space SP2 is surrounded with the convex portion 11p. The bottom of the second space SP2 is open. As described below, the second space SP2 is sealed from the external space by the workpiece to be gripped being positioned below the second space SP2.

As illustrated in FIG. 1 and FIG. 2, the gripper 10 further includes a first port 31 and a second port 32. The first port 31 communicates with the first space SP1. The second port 32 pierces the second portion 12 and the concave portion 11r of the first portion 11. The second port 32 communicates with the second space SP2. A first pipe 41 for depressurizing the first space SP1 is connected to the first port 31. A second pipe 42 for depressurizing the second space SP2 is connected to the second port 32.

The first portion 11 and the second portion 12 include a flexible material such as a resin, etc. In the embodiment as illustrated in FIG. 2, at least a portion of the first portion 11 includes a resin member R, and a fibrous member F provided inside the resin member R.

In the example illustrated in FIG. 2, at least a portion of the fibrous member F is provided as one body with a portion of the resin member R on the first space SP1 side of the first portion 11. In the example, the at least a portion of the fibrous member F recited above is provided along the inner surface of the first portion 11. As a specific example, the fibrous member F is buried in the resin member R. Or, a portion of the fibrous member F may be one body with the resin member R; and another portion of the fibrous member F may be exposed.

The fibrous member F includes multiple micro resin fibers that are entangled. For example, the fibrous member F is configured in a membrane configuration. The diameter of each resin fiber is about 50 nm to 10 μm. A portion of the resin member R is filled between at least a portion of the resin fibers included in the fibrous member F. Thereby, a portion of the resin member R and at least a portion of the fibrous member F are provided as one body.

For example, the multiple resin fibers extend in undesignated directions. The multiple resin fibers may extend in designated directions. Or, a portion of the multiple resin fibers may extend in one designated direction; and another portion of the multiple resin fibers may extend in another designated direction.

For example, the average diameter of the multiple resin fibers can be confirmed by the following method. The surface or the cross section of the fibrous member F is observed using an electron microscope, etc. One hundred of the confirmed resin fibers are selected randomly. The diameters of these resin fibers are averaged.

FIGS. 3A to 3D are cross-sectional views illustrating a gripping method using the gripping tool 1 according to the embodiment.

FIGS. 3A to 3D illustrate a case where a workpiece W to be gripped has a cross section in which three triangles are connected.

Figure 3A:
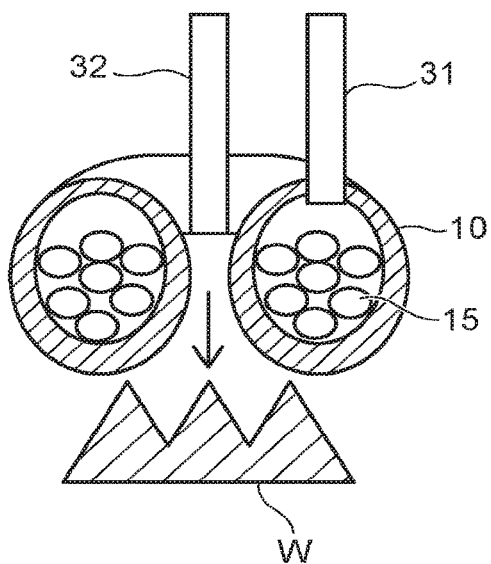
FIGS. 3A to 3D are cross-sectional views illustrating a gripping method using the gripping tool according to the embodiment.

First, the position in the horizontal direction of the gripper 10 and the position in the horizontal direction of the workpiece W are aligned. When the position of the gripper 10 and the position of the workpiece W are aligned, the gripper 10 is lowered toward the workpiece W as illustrated in FIG. 3A.

Figure 3B:
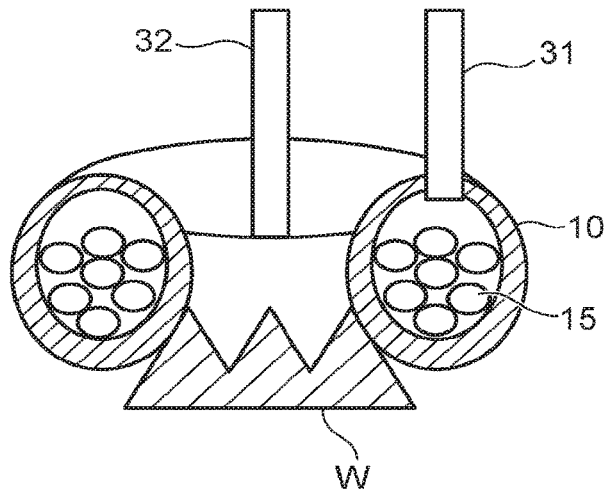

The gripper 10 is flexible. When the gripper 10 contacts the workpiece W, the convex portion 11p of the first portion 11 is pressed outward to envelope the workpiece W as illustrated in FIG. 3B. The second space SP2 that was open is sealed by the workpiece W.

Figure 3C:
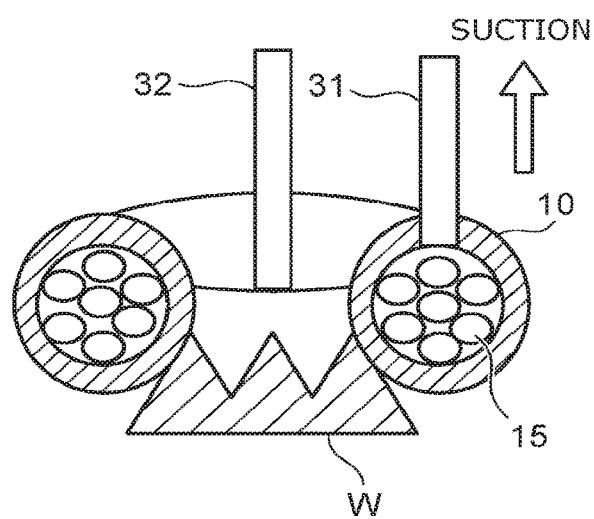

Then, the lowering of the gripper 10 is stopped. As illustrated in FIG. 3C, the first space SP1 is depressurized via the first port 31 and the first pipe 41. For example, the first space SP1 is depressurized to about 0.1 atmosphere. The granular material 15 in the first space SP1 jams and solidifies. The configuration of the gripper 10 enveloping the workpiece W and in close contact with the workpiece W is fixed thereby; and a force for gripping the workpiece W is generated.

Figure 3D:
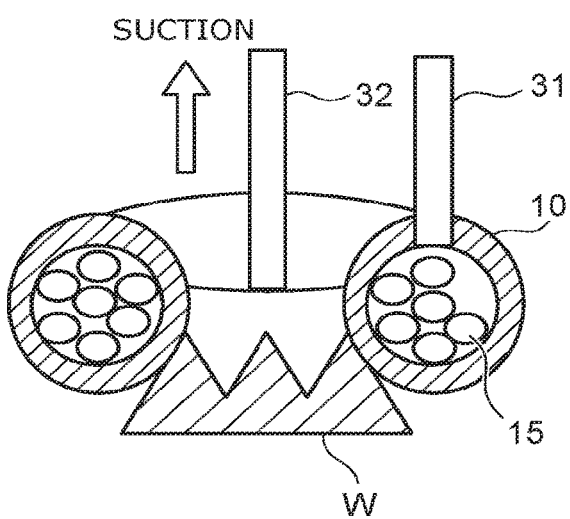

Then, as illustrated in FIG. 3D, the second space SP2 is depressurized via the second port 32 and the second pipe 42. For example, the second space SP2 is depressurized to about 0.1 atmosphere. Thereby, the workpiece W is pulled by suction toward the second space SP2; and the gripping force is increased further.

Subsequently, the gripping tool 1 that grips the workpiece W is lifted. The gripping tool 1 is moved in the horizontal direction. After the workpiece W is transferred to the prescribed position, the first space SP1 and the second space SP2 are opened to the atmosphere. Thereby, the gripping force is eliminated; and the workpiece W is released from the gripping tool 1. By the method described above, the workpiece W to be gripped is transferred to the prescribed position.

Figure 4A:
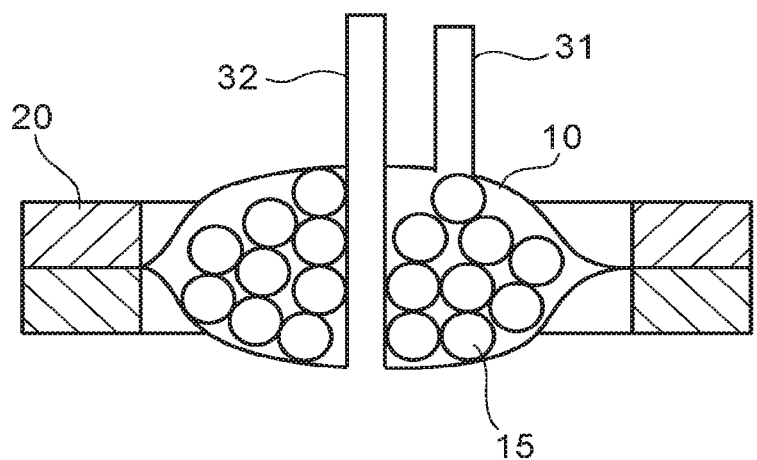
FIGS. 4A to 4C are cross-sectional views illustrating the gripping mechanism of the gripping tool according to the embodiment.
Figure 4B:
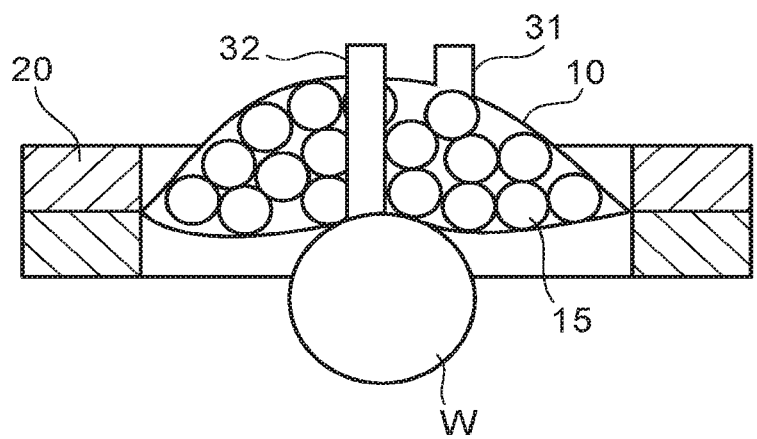
Figure 4C:
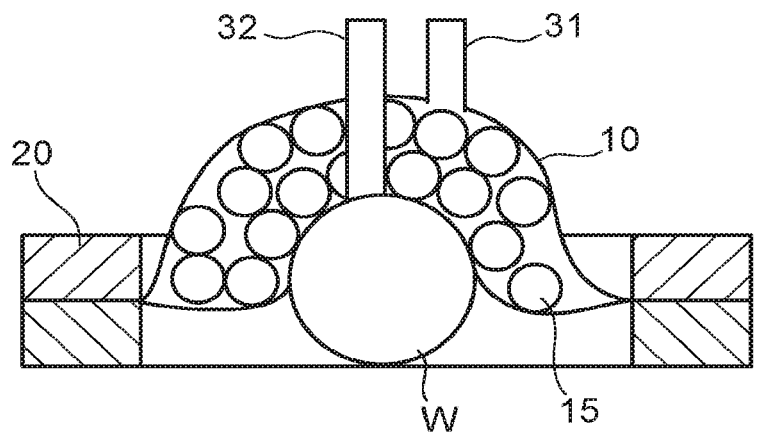

FIGS. 4A to 4C are cross-sectional views illustrating the gripping mechanism of the gripping tool 1 according to the embodiment.

The gripper 10 of the gripping tool 1 is partially simplified in FIGS. 4A to 4C.

In the gripping tool 1 according to the embodiment as illustrated in FIG. 4A, the outer perimeter of the gripper 10 is held by the holder 20. Accordingly, as illustrated in FIG. 4B, the gripper 10 can deform upward with respect to the workpiece W when the gripper 10 is caused to contact the workpiece W.

Air is suctioned via the first port 31 and the second port 32 in this state. Thereby, as illustrated in FIG. 4C, the contact surface area between the gripper 10 and the workpiece W increases while the gripper 10 deforms further upward with respect to the workpiece W.

As described above, the gripper 10 is held by the holder 20 to be deformable upward with respect to the workpiece W. According to this configuration, the gripping force can be increased when the workpiece W is gripped by the gripper 10.

Figure 5A:
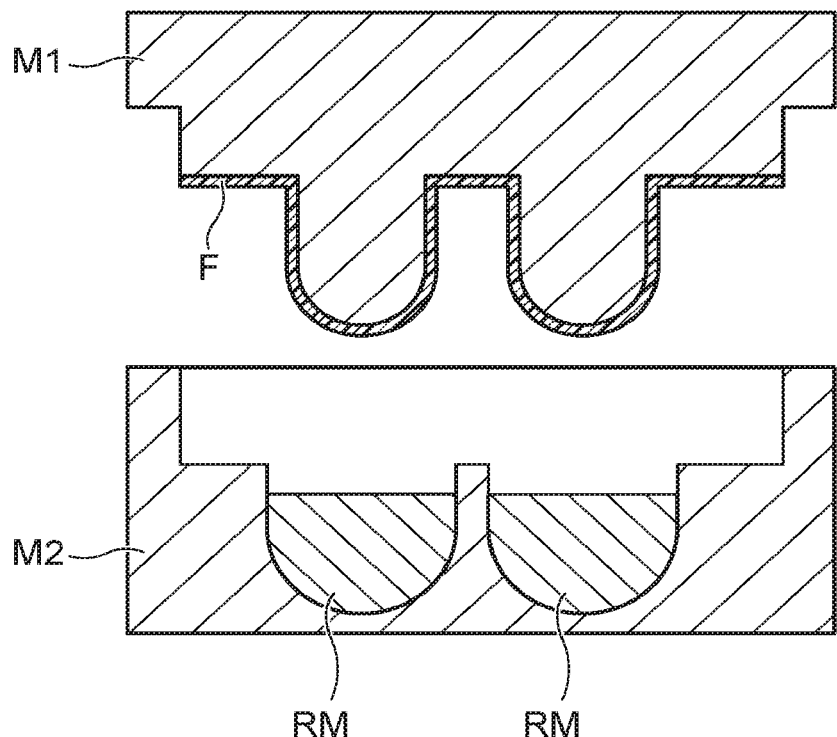
FIGS. 5A and 5B are process cross-sectional views illustrating a portion of the manufacturing processes of the gripper of the gripping tool according to the embodiment.
Figure 5B:
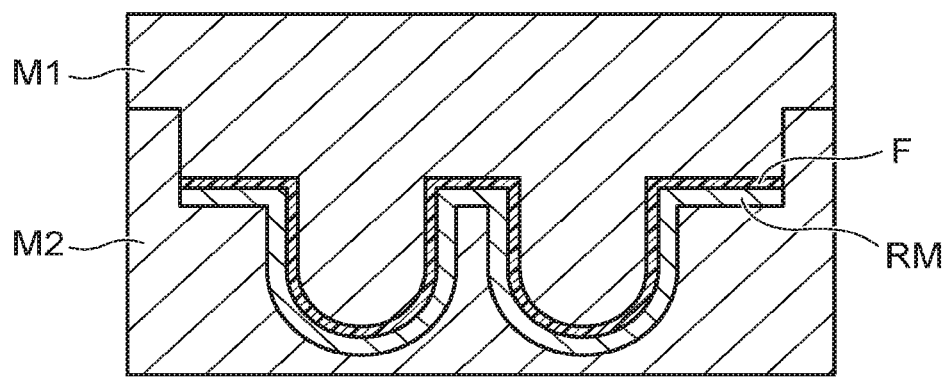

FIGS. 5A and 5B are process cross-sectional views illustrating a portion of the manufacturing processes of the gripper 10 of the gripping tool 1 according to the embodiment.

Here, a case is described where the first portion 11 includes the resin member R and the fibrous member F.

First, one set of a mold M1 (a first mold) and a mold M2 (a second mold) conforming to the configuration of the first portion 11 is prepared. Then, as illustrated in FIG. 5A, the fibrous member F is formed on the surface of the male-type mold M1. For example, the fibrous member F is formed using electrospinning.

The fibrous member F includes a high polymer material such as polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, polyethersulfone, etc.

A resin material RM that includes a high polymer material used as the source material of the resin member R is disposed in the female-type mold M2. The resin material RM may be a liquid or a gel. The resin material RM includes a high polymer material such as a silicone resin, a rubber material, an acrylic resin, etc.

Continuing as illustrated in FIG. 5B, the molds M1 and M2 are caused to engage and are pressed. Thereby, the resin material RM spreads and is filled between the molds M1 and M2; and the fibrous member F is immersed in the resin material RM. The resin material RM is cured in this state. The first portion 11 is made in which the fibrous member F is provided inside the resin member R.

Then, the granular material 15 is disposed inside the first portion 11 that is made. The second portion 12 that is made separately is overlaid on the first portion 11. The gripper 10 is made thereby. Subsequently, the gripper 10 is held by the holder 20. By the processes recited above, the gripping tool 1 illustrated in FIG. 1 and FIG. 2 is made. The granular material 15 may include, for example, microbeads, silicone resin beads, coffee beans, glass beads, etc.

Effects of the embodiment will now be described.

As described above, the gripping tool 1 causes the gripper 10 to contact the workpiece W, causes the granular material in the interior to jam, and transfers the workpiece W. Therefore, large stresses and large friction forces from the interior and the exterior are applied to the gripper 10. When a crack occurs and the gripper 10 ruptures due to these forces applied to the gripper 10, the granular material that is provided in the interior scatters. Accordingly, when the gripper 10 ruptures, time is necessary not only to repair the gripping tool 1 but also to clean the periphery of the gripping tool 1. As a result, the work efficiency is reduced greatly.

The inventors of the application discovered the following problems by investigation.

In the case where the gripper of the gripping tool includes only the resin member, the time from the crack occurrence to the rupture (hereinbelow, called the crack propagation time) is short. If the crack propagation time is short, the likelihood is high that the gripper may rupture before the user of the gripping tool can discover that the crack has occurred. Accordingly, it is difficult to stop the use of the gripping tool or repair the gripper before the rupture.

The inventors of the application discovered the following aspect by investigations and experiments.

Compared to the case where the gripper 10 includes only the resin member R, a longer crack propagation time of the gripper 10 is possible if at least a portion of the gripper 10 includes the resin member R and the fibrous member F. The longer crack propagation time makes it easy to take action before the gripper 10 ruptures. The decrease of the work efficiency due to the rupturing of the gripper 10 can be suppressed.

According to the embodiment as described above, the gripping tool 1 can be provided in which the crack propagation time of the gripper 10 is long; and the gripper 10 does not rupture easily.

As illustrated in FIG. 1 and FIG. 2, it is more desirable for the fibrous member F included in the gripper 10 to be provided on the first space SP1 side of the first portion 11.

The material described above (e.g., the silicone resin, the rubber material, or the acrylic resin) that is included in the resin member R has a high friction force. The gripping force of the gripper 10 is increased to improve the friction force. Compared to the case where the fibrous member F is provided at the exterior side of the first portion 11, the decrease of the friction force of the surface of the gripper 10 contacting the workpiece W can be suppressed by providing the fibrous member F on the first space SP1 side of the first portion 11. Thereby, the gripping force of the gripper 10 can be maintained to be high. In such a case, the gripper 10 does not include the fibrous member F at the surface contacting the workpiece W. Therefore, the gripper 10 easily deforms to conform to the configuration of the workpiece W when contacting the workpiece W.

The tensile strength per unit volume of the fibrous member F is higher than the tensile strength per unit volume of the resin member R. This is because the fibrous member F is an aggregate of fine resin fibers and has a high elasticity. Accordingly, even in the case where a crack occurs in the resin member R and the airtightness of the gripper 10 is ruptured, the fibrous member F is not ruptured; and the granular material 15 in the interior can be supported by the fibrous member F.

According to the embodiment, the rupture strength can be increased; the crack propagation time of the gripper 10 can be increased; and the rupturing of the gripper 10 does not occur easily. Because the crack propagation time of the gripper 10 is increased, it is also possible to prevent sudden scattering of the granular material 15, etc., beforehand.

In the embodiment, the gripper 10 is deformable upward with respect to the workpiece W when gripping the workpiece W. The gripping force can be increased thereby. Accordingly, by applying the embodiment, the gripping force can be increased while increasing the strength of the gripper 10 and suppressing rupturing.

The fibrous member F may not be provided in the entire first portion 11. The fibrous member F may be provided in only a portion of the first portion 11 such as the convex portion 11p, etc. The rupturing of the gripper 10 can be suppressed favorably by providing the fibrous member F in portions having a high contact frequency with the workpiece W.

The gripping tool according to the embodiment is not limited to the gripping tool illustrated in FIG. 1 and FIG. 2. Various modifications are possible as described below. In the gripping tools described below as well, the crack propagation time can be increased because at least a portion of the gripper 10 includes the resin member R and the fibrous member F.

Figure 6:
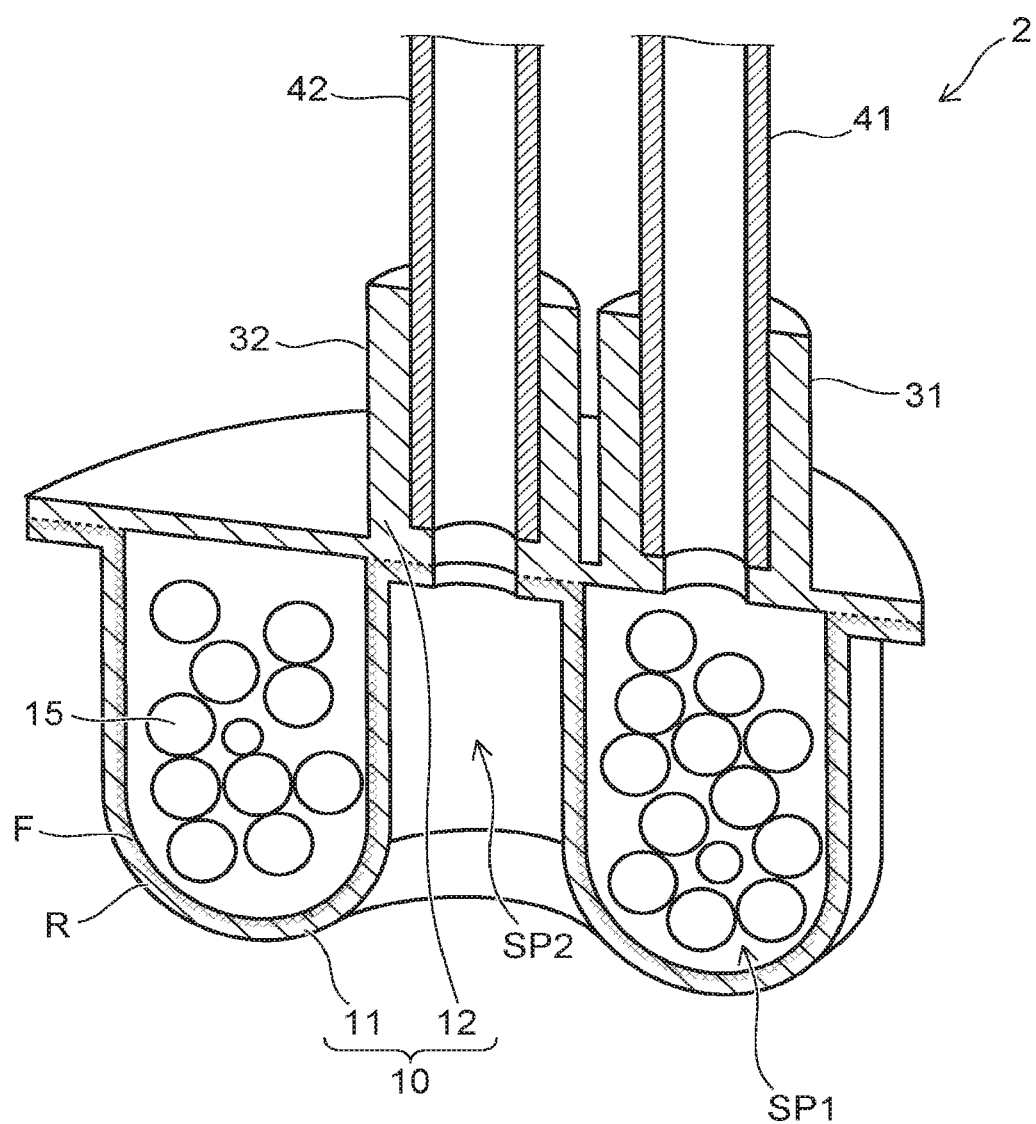
FIG. 6 is a perspective cross-sectional view illustrating a gripping tool according to a first modification of the embodiment.

FIG. 6 is a perspective cross-sectional view illustrating a gripping tool 2 according to a first modification of the embodiment.

The gripping tool 2 illustrated in FIG. 6 differs from the gripping tool 1 in that the holder 20 is not included. The outer perimeter of the first portion 11 is fixed by being bonded to the outer perimeter of the second portion 12.

Figure 7:
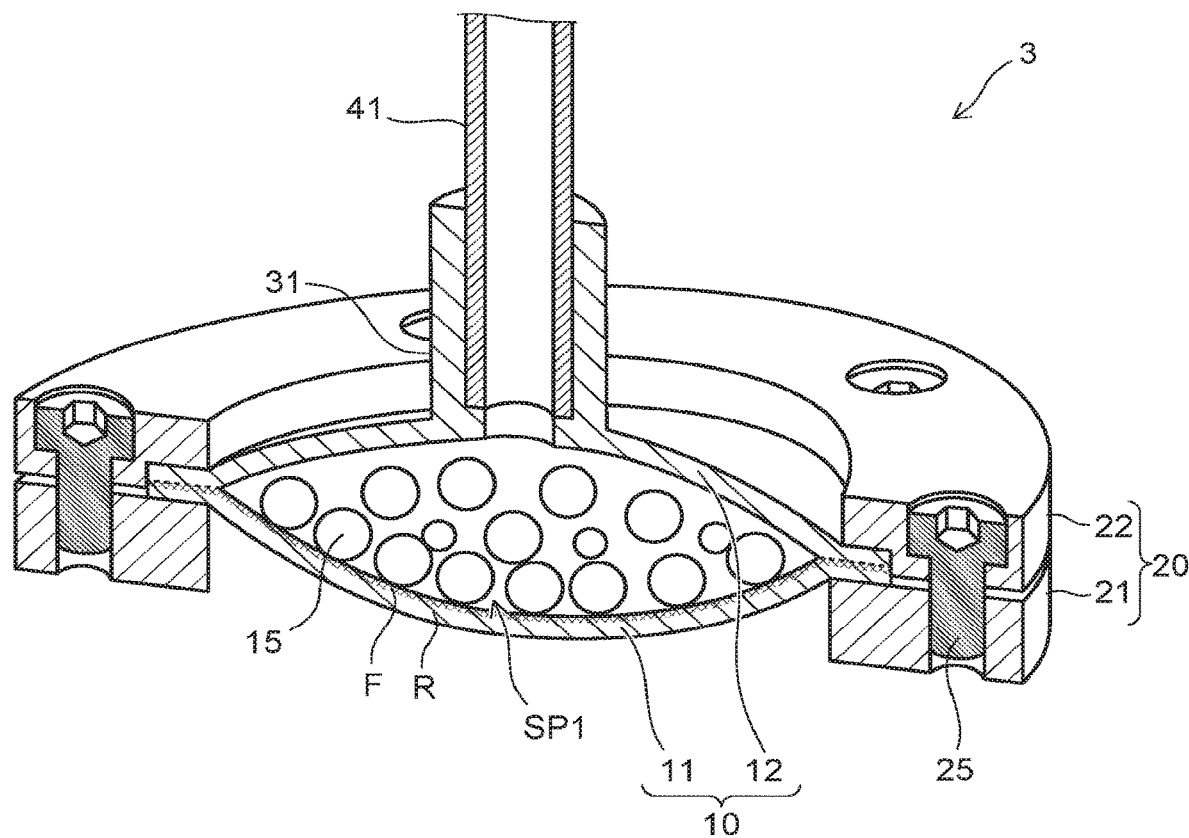
FIG. 7 is a perspective cross-sectional view illustrating a gripping tool according to a second modification of the embodiment.

FIG. 7 is a perspective cross-sectional view illustrating a gripping tool 3 according to a second modification of the embodiment.

In the gripping tool 3 illustrated in FIG. 7, compared to the gripping tool 1, the configuration of the gripper 10 is different; and the second port 32 is not provided.

In the gripper 10, the first portion 11 is curved to be convex downward. The second portion 12 is curved to be convex upward. The granular material 15 is provided in the first space SP1 between the first portion 11 and the second portion 12.

Compared to the gripping tool 1 illustrated in FIG. 1, the first portion 11 of the gripping tool 3 does not include the concave portion 11r and the convex portion 11p. Therefore, in the gripping tool 3, the second space SP2 is not formed below the first portion 11. The second port 32 is not provided in the gripping tool 3. However, in the gripping tool 3 according to the modification as well, similarly to the mechanism illustrated in FIGS. 3A to 3D, the gripper 10 is deformable upward with respect to the workpiece W when gripping the workpiece W. The gripping force of the gripper 10 can be increased thereby.

Figure 8:
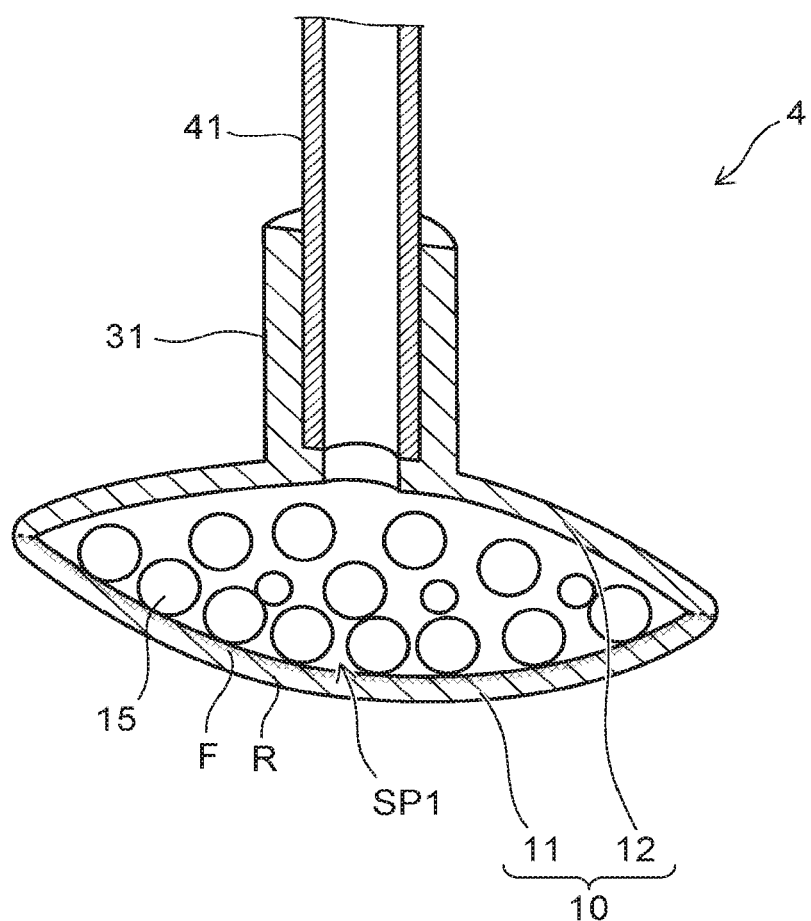
FIG. 8 is a perspective cross-sectional view illustrating a gripping tool according to a third modification of the embodiment.

FIG. 8 is a perspective cross-sectional view illustrating a gripping tool 4 according to a third modification of the embodiment.

The gripping tool 4 illustrated in FIG. 8 differs from the gripping tool 3 in that the holder 20 is not included. The outer perimeter of the first portion 11 is fixed by being bonded to the outer perimeter of the second portion 12.

Figure 9:
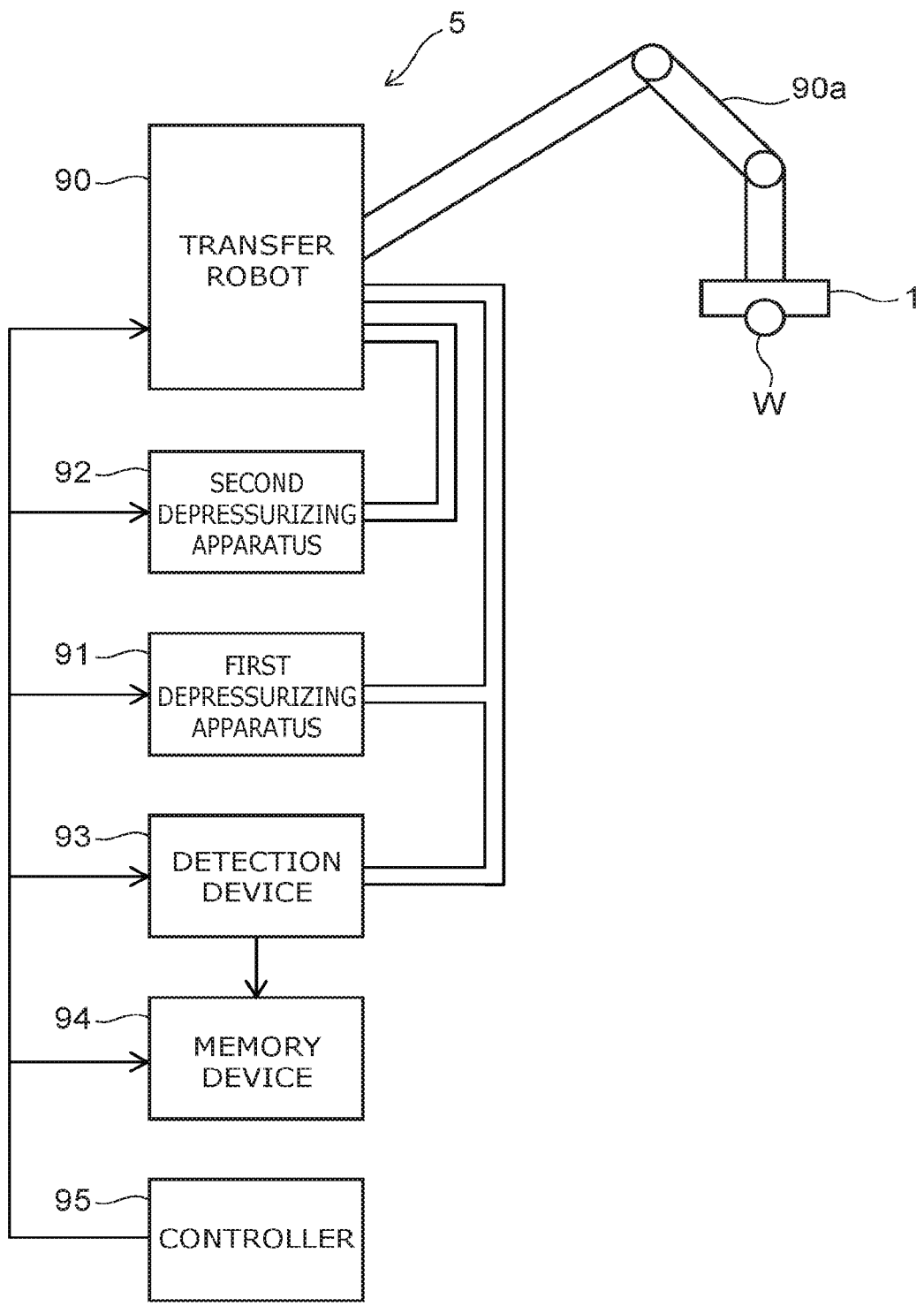
FIG. 9 is a schematic view illustrating a gripping system 5 according to the embodiment.

FIG. 9 is a schematic view illustrating a gripping system 5 according to the embodiment.

The gripping system 5 of the embodiment includes the gripping tool 1, a transfer robot 90, a first depressurizing apparatus 91, a second depressurizing apparatus 92, a detection device 93, a memory device 94, and a controller 95.

The transfer robot 90 includes an arm 90a. For example, the arm 90a includes multiple joints. The gripping tool 1 is mounted to the tip of the arm 90a. The transfer robot 90 operates the arm 90a according to a command from the controller 95 and grips and transfers the workpiece W.

The first depressurizing apparatus 91 and the second depressurizing apparatus 92 include vacuum pumps, etc. The first depressurizing apparatus 91 is connected to the first pipe 41 of the gripping tool 1 illustrated in FIG. 1. The second depressurizing apparatus 92 is connected to the second pipe 42 of the gripping tool 1. The first depressurizing apparatus 91 and the second depressurizing apparatus 92 are driven according to commands from the controller 95. The first space SP1 and the second space SP2 are depressurized and opened to the atmosphere thereby.

The detection device 93 communicates with the first space SP1. The detection device 93 directly or indirectly detects one of the pressure of the first space SP1 or the flow rate of the gas flowing through the first space SP1 (a first parameter). In the example illustrated in FIG. 9, the detection device 93 is connected to a pipe between the first space SP1 and the first depressurizing apparatus 91. The detection device 93 detects the pressure or the flow rate in the pipe. The gripping system 5 may include multiple detection devices to detect both the pressure and the flow rate of the first space SP1.

The detection device 93 outputs the detection result to the controller 95. The controller 95 detects an abnormality based on the detection result of the detection device 93. In the case where the detection device 93 detects an abnormality, the result is notified to the manager of the gripping system 5, and/or the operation of the gripping system 5 is stopped.

The memory device 94 is a network hard disk, a server file, a hard disk accompanying the detection device 93, etc. The memory device 94 collects and stores the pressure or the flow rate detected by the detection device 93.

The controller 95 includes a CPU (Central Processing Unit), ROM (Read Only Memory), nonvolatile flash memory, etc. Various processing of the controller 95 is performed by the CPU. Various control algorithms, various constants, and the like that are necessary for the operation of the gripping system 5 are stored in the ROM. The transfer procedure, the transfer conditions, and the like of the workpiece W are stored as appropriate in the flash memory.

According to the transfer procedure stored in the flash memory, the controller 95 sends commands to control the operations of the transfer robot 90, the first depressurizing apparatus 91, the second depressurizing apparatus 92, and the detection device 93.

Because the gripping system 5 includes the gripping tool 1 having the long crack propagation time of the gripper 10, the decrease of the work efficiency can be suppressed even in the case where a crack occurs in the gripper 10.

The gripping system 5 according to the embodiment may include one of the gripping tools 2 to 4 according to the modifications described above instead of the gripping tool 1. In the case where the gripping system 5 includes the gripping tool 3 or 4, the gripping system 5 may not include the second depressurizing apparatus 92.

A method for detecting the abnormal value of the pressure or the flow rate of the gripping system 5 according to the embodiment will now be described with reference to FIG. 10. Here, a case is described where the pressure of the first space SP1 is detected by the detection device 93.

Figure 10:
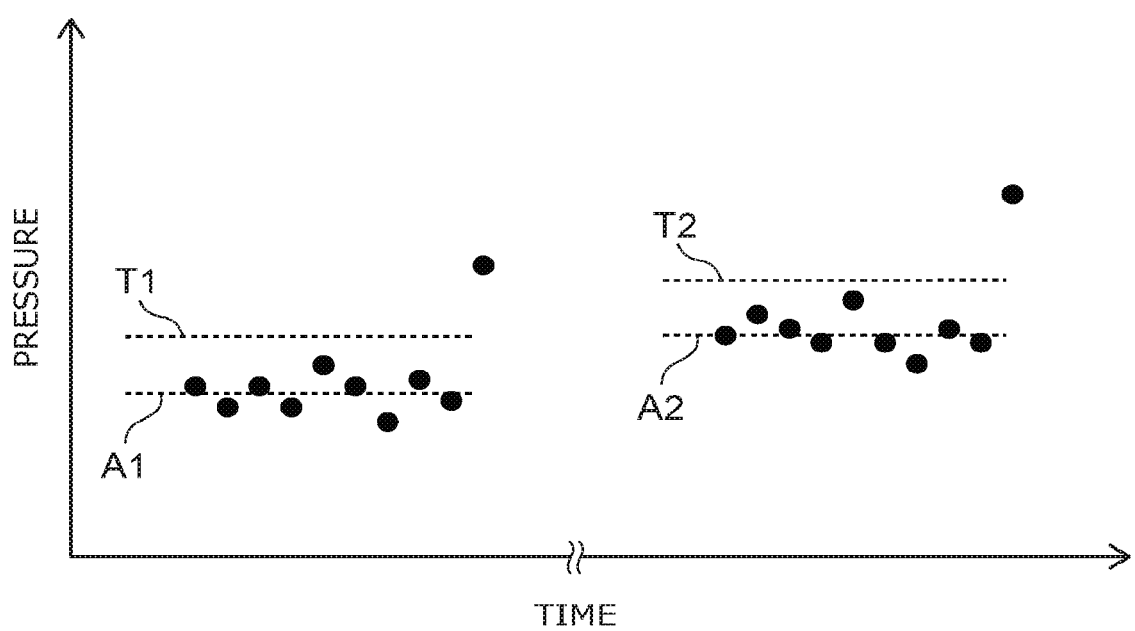
FIG. 10 is a graph illustrating an example of the detection result of the detection device 93 of the gripping system 5 according to the embodiment.

FIG. 10 is a graph illustrating an example of the detection result of the detection device 93 of the gripping system 5 according to the embodiment.

In FIG. 10, the horizontal axis is time; and the vertical axis is the detection result of the pressure at each time.

When the first space SP1 is depressurized by the first depressurizing apparatus 91, the controller 95 determines that an abnormality has occurred in the gripper 10 in the case where a large pressure exceeding a prescribed threshold is detected by the detection device 93.

In such a case, for example, the threshold is set based on multiple detection results between the current time and a prescribed period of time before the current time. Or, the threshold may be set based on a prescribed number of times of recent detection results.

One specific example will now be described. The controller 95 refers to the memory device 94. As illustrated on the left side in the graph of FIG. 10, the controller 95 extracts a prescribed number of times of recent detection results. The controller 95 calculates an average value A1 of the detection results. Then, the controller 95 uses, as a threshold T1, a prescribed value added to the calculated average value A1. According to this method, the average value A1 and the threshold T1 both change each time a new pressure is detected by the detection device 93.

When a crack occurs in the gripper 10 when depressurizing and air flows into the first space SP1, the pressure that is detected by the detection device 93 increases greatly. When the pressure that is detected by the detection device 93 exceeds the threshold T1, the controller 95 determines that an abnormality has occurred in the gripper 10.

Generally, in a vacuum component for which the depressurizing and the opening to the atmosphere are repeated, the airtightness degrades as the period of use continues. Also, the pressure reached when depressurizing increases. Accordingly, as time elapses as illustrated on the right side in the graph of FIG. 10, the pressure that is detected by the detection device 93 increases. If the threshold T1 is unchanging, as the period of use of the gripping system 5 continues, there is a possibility that the pressure in the normal operation of the gripping system 5 may be determined to be abnormal.

In the embodiment, the controller 95 sets the threshold based on the detection results stored in the memory device 94. Therefore, even in the case where the gripping system 5 is used for a long period of time and the pressure reached by the first space SP1 changes, the occurrence of the abnormality of the gripper 10 can be determined with higher accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A gripping tool, comprising:
   a gripper including a first portion configured to contact a workpiece and a second portion opposing the first portion, the gripper being flexible and the first portion including:
      a concave portion recessed toward a first direction, the first direction extending from the first portion toward the second portion, and
      a convex portion protruding toward a second direction opposite to the first direction and provided around the concave portion;
   a granular material provided in a first space between the first portion and the second portion;
   a first port communicating with the first space;
   a first pipe connected to the first port and configured to depressurize the first space;
   a second port communicating with a second space surrounded with the concave portion and the convex portion; and
   a second pipe connected to the second port and configured to depressurize the second space, the second space being separate from the first space, wherein
   the gripping tool is configured to grip the workpiece by depressurizing the first space in a state in which the gripper is caused to contact the workpiece,
   at least a portion of the convex portion includes a resin member and a fibrous member, the fibrous member being provided inside the resin member,
   the gripping tool further comprises a holder holding an outer perimeter of the first portion and an outer perimeter of the second portion, and
   the second portion is configured such that part of the second portion can be deformed toward the first direction more than the outer perimeter of the second portion.

2. The gripping tool according to claim 1, wherein the fibrous member is provided on a first space side of the first portion.

3. The gripping tool according to claim 1, wherein
   the second port penetrates the second portion and the concave portion, and
   a dimension of the concave portion in a direction perpendicular to the first direction is longer than a dimension of a penetrated part of the second portion in the perpendicular direction.

4. The gripping tool according to claim 1, wherein the first portion and the second portion are configured to be deformable along a line direction connecting the first portion and the second portion.

5. The gripping tool according to claim 1, wherein
   the fibrous member includes a plurality of resin fibers, and
   a diameter of each of the resin fibers is not less than 50 nm and not more than 10 μm.

6. The gripping tool according to claim 1, wherein the fibrous member includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

7. A gripping tool, comprising:
   a gripper including a first portion configured to contact a workpiece and a second portion opposing the first portion, the gripper being flexible; and
   a granular material provided in a first space between the first portion and the second portion, wherein
   the gripping tool is configured to grip the workpiece by depressurizing the first space in a state in which the gripper is caused to contact the workpiece,
   at least a portion of the first portion including a resin member and a fibrous member, the fibrous member being provided inside the resin member,
   the first portion and the second portion are configured to be deformable along a line direction connecting the first portion and the second portion,
   the gripping tool further comprises a holder holding an outer perimeter of the first portion and an outer perimeter of the second portion,
   the second portion is configured such that part of the second portion can be deformed toward a first direction more than the outer perimeter of the second portion, and
   the first direction extends from the first portion toward the second portion.

8. The gripping tool according to claim 7, wherein the first portion includes:
   a concave portion recessed toward a first direction, the first direction extending from the first portion toward the second portion; and
   a convex portion protruding toward a second direction opposite to the first direction and provided around the concave portion, and
   at least a portion of the convex portion includes the resin member and the fibrous member.

9. The gripping tool according to claim 8, further comprising:
   a first port communicating with the first space;
   a first pipe connected to the first port and configured to depressurize the first space;
   a second port communicating with a second space surrounded with the concave portion and the convex portion; and
   a second pipe connected to the second port and configured to depressurize the second space.

10. The gripping tool according to claim 7, wherein the fibrous member is provided on a first space side of the first portion.

11. The gripping tool according to claim 7, wherein
   the fibrous member includes a plurality of resin fibers, and
   a diameter of each of the resin fibers is not less than 50 nm and not more than 10 μm.

12. The gripping tool according to claim 7, wherein the fibrous member includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

13. A gripping system, comprising:
a robot mechanism including an arm;
a gripping tool mounted to a tip of the arm;
a first depressurizing apparatus connected to the first pipe, the first depressurizing apparatus configured to depressurize the first space; and
a controller configured to control operations of the robot mechanism and the first depressurizing apparatus, wherein
the gripping tool comprises
a gripper including a first portion configured to contact a workpiece and a second portion opposing the first portion, the gripper being flexible and the first portion including:
a concave portion recessed toward a first direction, the first direction extending from the first portion toward the second portion, and
a convex portion protruding toward a second direction opposite to the first direction and provided around the concave portion;
a granular material provided in a first space between the first portion and the second portion;
a first port communicating with the first space;
a first pipe connected to the first port and configured to depressurize the first space;
a second port communicating with a second space surrounded with the concave portion and the convex portion; and
a second pipe connected to the second port and configured to depressurize the second space, the second space being separate from the first space,
the gripping tool is configured to grip the workpiece by depressurizing the first space in a state in which the gripper is caused to contact the workpiece, and
at least a portion of the convex portion includes a resin member and a fibrous member, the fibrous member being provided inside the resin member.

14. The gripping system according to claim 13, further comprising a detection device configured to detect a first parameter of the first space, wherein
the first parameter is a pressure of the first space or a flow rate of a gas flowing through the first space, and
the controller is configured to determine that an abnormality has occurred in the gripper when the first parameter detected by the detection device exceeds a prescribed threshold.

15. The gripping system according to claim 14, further comprising a memory device configured to store a previous first parameter detected by the detection device, wherein
the controller is configured to set the prescribed threshold based on the previous first parameter.

16. A method for manufacturing a gripper, the gripper being flexible and a granular material being provided in an interior of the gripper, the method comprising:
forming a fibrous member including a plurality of fibers on a first mold;
disposing a resin material including a high polymer material on a second mold configured to engage the first mold;
causing the first mold and the second mold to engage to fill the resin material between the first mold and the second mold while immersing the fibrous member in the resin material; and
curing the resin material filled between the first mold and the second mold, wherein
the gripper includes:
a first portion configured to contact a workpiece, the fibrous member being provided in at least a portion of the first portion; and
a second portion opposing the first portion, the granular material being provided in a first space between the first portion and the second portion, and
the first portion is made by curing the resin material filled between the first mold and the second mold.

17. The method according to claim 16, wherein
the first mold is a male-mold,
the second mold is a female-mold, and
the first portion is made to cause the fibrous member formed on the first mold to be positioned at an inner side of the first portion.

18. The method according to claim 16, further comprising:
disposing the granular material inside the first portion; and
making the gripper by preparing the second portion and overlaying an outer perimeter of the second portion and an outer perimeter of the first portion having the granular material disposed inside, wherein
the gripper is made to be deformable in a direction of a line connecting the first portion and the second portion.

19. A gripping tool, comprising:
a gripper including a first portion configured to contact a workpiece and a second portion opposing the first portion, the gripper being flexible;
a granular material provided in a first space between the first portion and the second portion, wherein
the gripping tool is configured to grip the workpiece by depressurizing the first space in a state in which the gripper is caused to contact the workpiece,
at least a portion of the first portion including a resin member and a fibrous member, the fibrous member being provided inside the resin member,
the first portion and the second portion are configured to be deformable along a line direction connecting the first portion and the second portion,
the fibrous member includes a plurality of resin fibers, and
a diameter of each of the resin fibers is not less than 50 nm and not more than 10 µm.

20. A gripping tool, comprising:
a gripper including a first portion configured to contact a workpiece and a second portion opposing the first portion, the gripper being flexible;
a granular material provided in a first space between the first portion and the second portion, wherein
the gripping tool is configured to grip the workpiece by depressurizing the first space in a state in which the gripper is caused to contact the workpiece,
at least a portion of the first portion including a resin member and a fibrous member, the fibrous member being provided inside the resin member,
the first portion and the second portion are configured to be deformable along a line direction connecting the first portion and the second portion, and
the fibrous member includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

21. A gripping tool, comprising:
a gripper including a first portion configured to contact a workpiece and a second portion opposing the first portion, the gripper being flexible and the first portion including:
   a concave portion recessed toward a first direction, the first direction extending from the first portion toward the second portion, and
   a convex portion protruding toward a second direction opposite to the first direction and provided around the concave portion;
a granular material provided in a first space between the first portion and the second portion;
a first port communicating with the first space;
a first pipe connected to the first port and configured to depressurize the first space;
a second port communicating with a second space surrounded with the concave portion and the convex portion;
a second pipe connected to the second port and configured to depressurize the second space, the second space being separate from the first space, wherein
the gripping tool is configured to grip the workpiece by depressurizing the first space in a state in which the gripper is caused to contact the workpiece,
at least a portion of the convex portion includes a resin member and a fibrous member, the fibrous member being provided inside the resin member,
the fibrous member includes a plurality of resin fibers, and
a diameter of each of the resin fibers is not less than 50 nm and not more than 10 μm.

22. A gripping tool, comprising:
a gripper including a first portion configured to contact a workpiece and a second portion opposing the first portion, the gripper being flexible and the first portion including:
   a concave portion recessed toward a first direction, the first direction extending from the first portion toward the second portion, and
   a convex portion protruding toward a second direction opposite to the first direction and provided around the concave portion;
a granular material provided in a first space between the first portion and the second portion;
a first port communicating with the first space;
a first pipe connected to the first port and configured to depressurize the first space;
a second port communicating with a second space surrounded with the concave portion and the convex portion;
a second pipe connected to the second port and configured to depressurize the second space, the second space being separate from the first space, wherein
the gripping tool is configured to grip the workpiece by depressurizing the first space in a state in which the gripper is caused to contact the workpiece,
at least a portion of the convex portion includes a resin member and a fibrous member, the fibrous member being provided inside the resin member, and
the fibrous member includes a polymer material comprising at least one selected from polypropylene, polyethylene, polystyrene, polyethylene terephthalate, polyvinyl chloride, polycarbonate, nylon, aramid, polyacrylate, polymethacrylate, polyimide, polyamide-imide, polyvinylidene fluoride, and polyethersulfone.

* * * * *